June 17, 1969  J. M. HARWELL, JR  3,450,421
BALL CONNECTOR

Filed June 20, 1966　　　　　　　　　　　　　　　　Sheet 1 of 2

INVENTOR.
James M. Harwell, Jr.
BY
Cushman, Darby & Cushman
ATTORNEYS

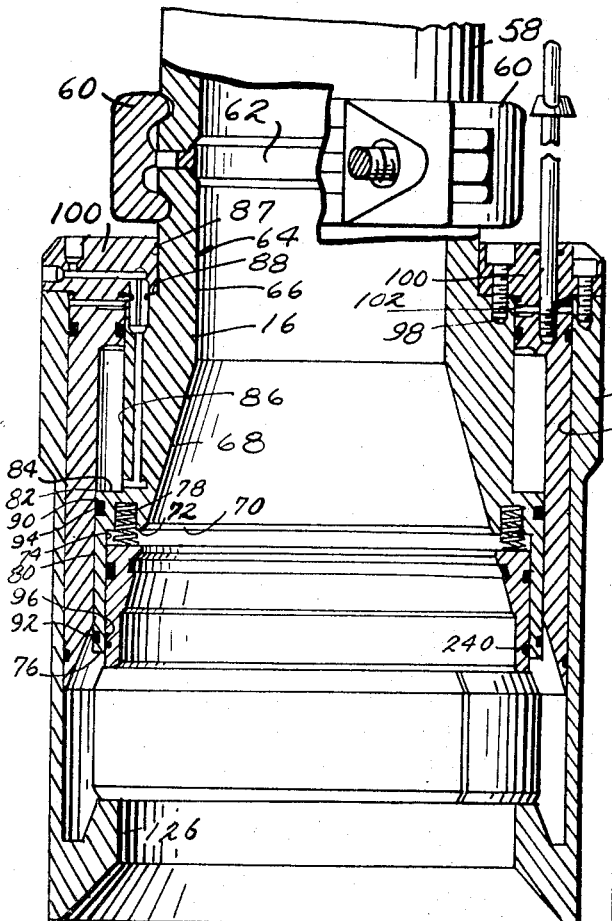
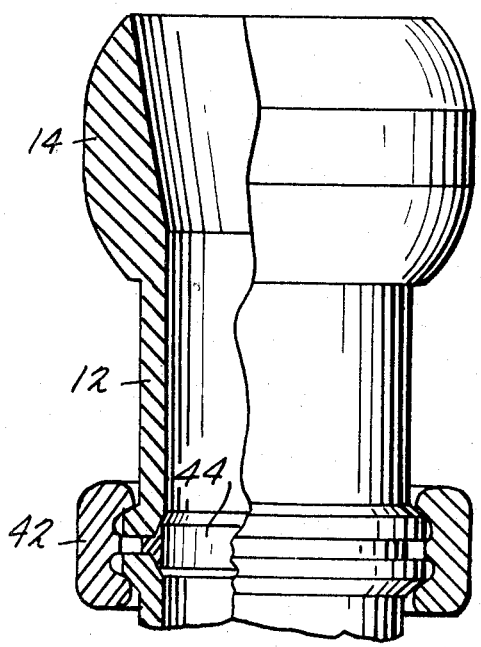
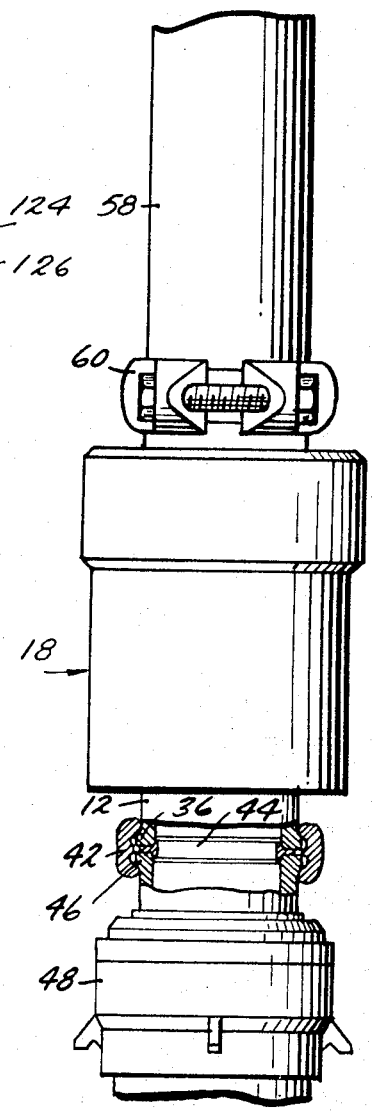

3,450,421
BALL CONNECTOR
James M. Harwell, Jr., Houston, Tex., assignor to Gray Tool Company, Houston, Tex., a corporation of Texas
Filed June 20, 1966, Ser. No. 558,800
Int. Cl. F16l 55/00, 35/00; E21b 7/12
U.S. Cl. 285—24                                  9 Claims

ABSTRACT OF THE DISCLOSURE

For incorporation in a string of conduit extending between the well head and drilling platform of an offshore well, a combined flexible joint and remotely connectable and disconnectable union which includes a first conduit having a ball member and a second conduit having socket or ball housing member wherein the first and second conduits are disconnectable by withdrawal of the ball housing member from locked and enclosing relationship with respect to the ball member and wherein the first and second conduits are connectable by inserting the ball member into the ball housing member and locking it therein.

---

The present invention relates to remotely connectable and disconnectable connectors and more particularly to a pivotable, rotatable conduit connection susceptible of make-up and severance at the pivot and operable from a point remote with respect to the connection.

When floating platforms, including self-propelled vessels are used to drill offshore petroleum wells, it has become customary to locate the well head and blowout preventer stack at or near the ocean floor and have a marine conductor or riser pipe extend from the blowout preventer stack to the platform. The riser pipe excludes the sea from the well, confines drilling mud returning to the surface and other fluids such as cement displaced into or issuing from the well, and may act as a guide for the lowering and raising of drilling equipment and the lowering of the first casing string and its hanger into the well. Currents, tides, swells, waves, wind and other forces acting on the riser and platform combine to exert complex forces on the riser assembly. In most offshore drilling of this type, one or more flexible joints, telescopic joints and remotely operated unions are interposed in the riser in order to accommodate these complex forces. Such equipment is costly, provides more failure-susceptible points than a conventional string of conduit since so many more machined parts, moving elements and connections are required.

It is a primary object of the present invention to reduce the failure susceptible points and number of connections needed in such risers by providing a combined flexible joint and remotely connectable and disconnectable union.

A further object of the invention is the provision of apparatus of the type described which includes a first conduit having a ball member and a second conduit having socket or ball housing member wherein the first and second conduits are disconnectable by withdrawal of the ball housing member from locked and enclosing relationship with respect to the ball member and wherein the first and second conduits are connectable by inserting of the ball member into the ball housing member and locking it therein.

Another object of the present invention is the provision in apparatus of the type described, of resiliently biased circumferential sealing means within the housing engageable with the ball member to seal between the bore and exterior of the first and second conduits.

Yet another object of the present invention is the provision, in apparatus of the type described, of an expansible bearing ring within the housing for transmitting axial loads, due to fluid pressure and external forces, between the ball member and housing.

The present invention provides an articulated disconnectable connector for interposition in a generally vertical underwater well riser, comprising: a first conduit having generally ball-shaped member formed exteriorly circumferentially thereon at one end thereof, the bore of the first conduit proceeding through said ball-shaped member; a second conduit having means defining a generally tubular housing thereon constructed and arranged to accept said ball-shaped member in the bore thereof through one end of said bore; means defining a circumferential seat in said bore constructed and arranged to contact said ball-shaped member and limit incursion of said ball-shaped member into said bore; expansible-contractile locking means comprising a generally annular bearing ring of elastic hard metal, received in said bore axially spaced from said seat toward said bore one end and movable between a first position wherein said ball-shaped member is relatively movable axially past said locking means into and out of said bore, and a second position wherein said locking means generally annularly engages said ball-shaped member near said first member one end and retains said ball-shaped member in said bore in engagement with said seat; movable means received in said housing for selectively locking said bearing ring against forcible expansion from said second position to said first position thereof, said movable means comprising: a generally tubular piston received in said housing bore and being axially movable between a first position wherein said tubular piston circumferentially surrounds and radially restricts expansion of said bearing ring and second position wherein said tubular piston is disengaged from said bearing ring and said bearing ring is radially unconstrained by the tubular piston sufficiently to permit forcible expansion of said bearing ring from said second position to said first position.

These and further objects of the present invention as well as the principles and scope of advantageous applicability thereof will appear and become more vivid during the course of the following detailed discussion relating to the embodiment illustrated in the attached drawings.

In the drawings:

FIGURE 2 is a longitudinal sectional view, on a smaller scale, of the ball connector of FIGURE 1 in a disconnected, separated condition; and FIGURE 3 is a fragmentary side elevation view of the ball connector of FIGURES 1 and 2 installed in a marine conductor pipe between the blowout preventer stack and the remainder of the riser.

Figure 1:
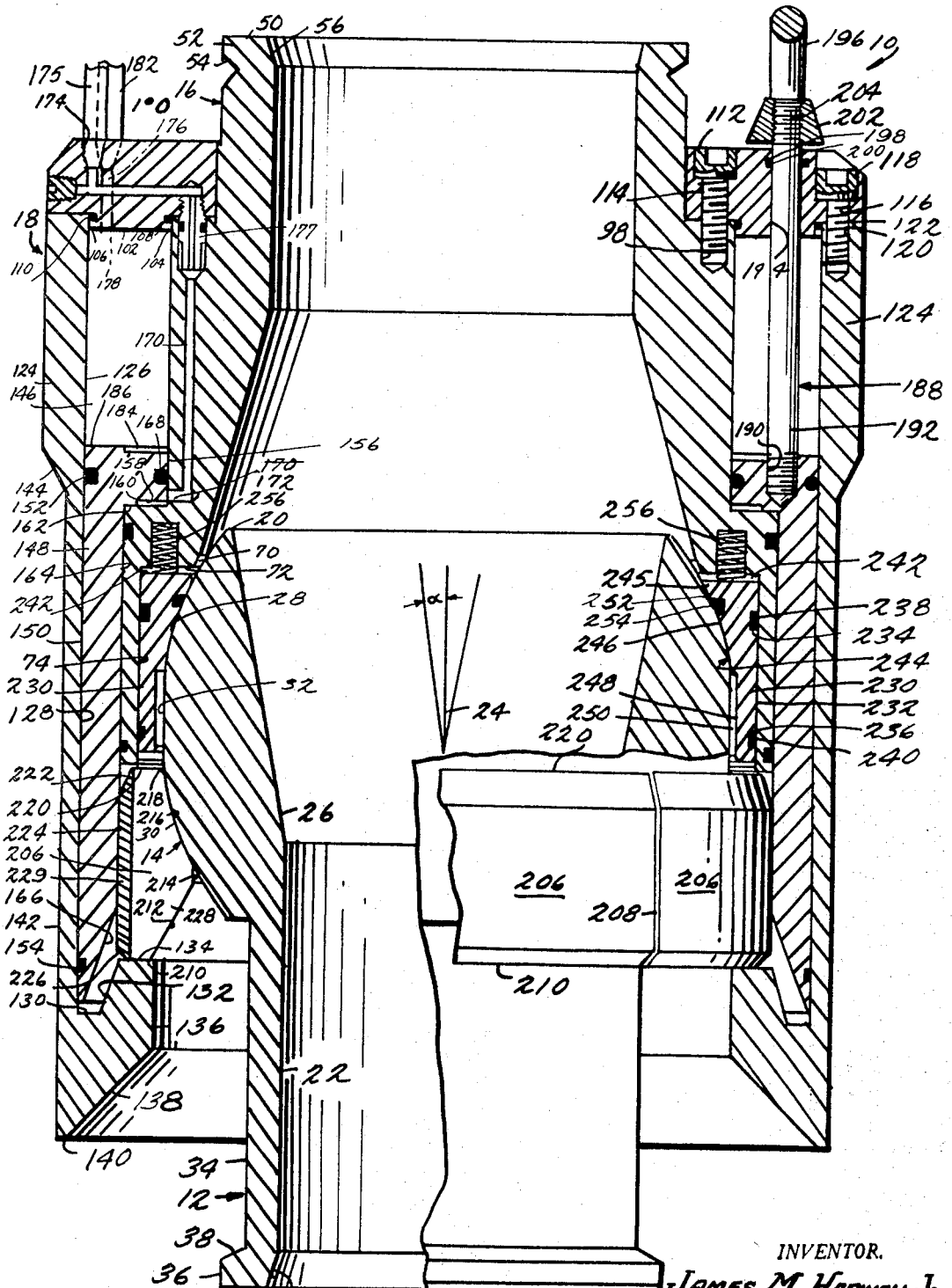
FIGURE 1 is a longitudinal sectional view of a ball connector according to the present invention in a connected condition.

The ball connector 10 includes a first tubular conduit 12 having an integral, upwardly presented ball member 14 and a second tubular conduit 16 having a unitary, downwardly presented ball housing member 18. In the illustrated embodiment, the ball member 14 comprises an external enlargement on the conduit 12 adjacent and leading to the upper end 20 thereof. The throughbore 22 of the conduit 12 thus proceeds through the ball member. Within the ball member 14, beginning below the geometric center 24 of the ball member, the throughbore 22 flares at 26 making about a 10 degree angle $\alpha$ with the longitudinal axis of the throughbore 22 in order to prevent choking of the well bore when the riser is canted at an extreme with respect to the ball member as will be more completely outlined hereinafter. Exteriorly, the ball member 14 is generally spherically curved, at least in an upper and a lower wide annular band 28, 30, defining bearing surfaces. Intermediate the bearing surfaces 28, 30, the ball member may be radially relieved as shown at 32 in order to minimize the area of the ball member and housing which must be precisely machined to fit one another and to provide a guide surface. Below the ball member 14, the first tubular conduit is shown having a generally cylindrical external surface 34 and having a wedging flange 36 at its lower end. The flange 36 includes an external frusto-conically curved, clamp receiving surface 38 and includes a flared, frusto-conically curved sealing surface 40 in the bore 22 for receiving a clamp 42 and deflectable lip, ribbed sealing ring 44 (FIGURE 2) substantially as shown in FIGURE 2 of the U.S. patent to Watts et al. 2,766,999. As shown in FIGURE 3, the clamp 42 secures the conduit 12 to the upper, tubular, like-flanged end 46 of a blowout preventer stack 48, the ring 44 being received between and sealing between the conduit 12 and blowout preventer stack 48. It should be appreciated that the flange 36, clamp 42 and ring 44 are exemplary of securement and sealing means generally.

At its upper end 50, the conduit 16 has a wedging flange 52 similar in material respects to the flange 36 including having a tapered sealing surface 54 and flange wedging surface 56 whereby the conduit 16 is secured to the lower end of the riser 58 (FIGURES 2 and 3) via a clamp 60, a sealing ring 62 being interposed between the conduit 16 and riser 58. The conduit 16 has a longitudinal throughbore 64 which is generally cylindrically curved at 66, then flares generally frusto-conically outwardly and downwardly at 68. The surface 68 at its lower extent intersects an annular, spherically curved stop surface 70 that enlarges and faces downwardly and is curved complementarily to the ball member bearing surface 28 about the longitudinal axis of the throughbore 64. At the lower extent of the stop surface 70, the bore 64 enlarges essentially radially to provide an annular downwardly facing stop surface 72. At its radially outer extent, the stop surface 72 is intersected by a generally cylindrically curved surface 74 which extends substantially to the lower end 76 of the conduit 16. A plurality of angularly spaced downwardly opening, longitudinally elongated sockets 78 are formed in the conduit 16 from centrally of the surface 72.

From the lower end 76, the conduit 16 exterior is first generally cylindrically curved at 80 up to a point 82 somewhat above the surface 72 where the surface 80 intersects the radially outer extent of a generally radially extending, annular upwardly facing stop shoulder 84. From the radially inner extent of the shoulder 84, the conduit 16 exterior proceeds generally cylindrically at 86 to the radially outer extent of a radially extending, annular, upwardly facing cylinder head radially inner seat 88 and generally cylindrically at 87 from the radially inner extent of the seat 88 toward the upper end of the conduit 16. The surface 80 is circumferentially grooved at 90 and 92 adjacent its upper and lower extent to receive sealing members such as O-rings 94 and 96 respectively.

A plurality of upwardly opening, angularly spaced, longitudinally elongated threaded sockets 98 are formed in the seat 88 intermediate the radially inner and outer extent thereof. An annular cylinder head 100 is received on the seat 88 and projects radially outwardly therebeyond. The cylinder head lower surface 102 is generally planar, but jogs down at 104 then up at 106 to define a radially inwardly facing vertical surface at 104 which is circumferentially grooved to receive an O-ring 108 presented radially inwardly and a radially outwardly facing vertical surface at 106 which is circumferential grooved to receive an O-ring 110 presented radially outwardly.

The cylinder head 100 is secured to the conduit 16 by a plurality of angularly spaced vertically oriented, recessed head cylinder head bolts 112, threaded through openings 114 and into the sockets 98. Nearer the radially outer extent thereof a plurality of angularly spaced threaded openings 116 are formed vertically through the head 100 and receive recessed head cyclinder head bolts 118. The bolts 118 project downwardly into threaded upwardly opening sockets 120 formed in the upper end 122 of a generally tubular cylinder body radially outer member 124. The O-ring 108 seals with the exterior of the conduit 16 and the O-ring 110 with the bore 126 of the tubular member 124. The bore 126 is radially spaced from the exterior of the conduit 16 and is generally cylindrically curved at 128 until for instance 10 inches below the lower end 76 of the conduit 16, in an embodiment where the total length from the upper end of the second conduit to the lower end of the first conduit is, for instance, 51 inches and the two conduits have an internal bore of 13 5/8 inches diameter. At the lower extent of the surface 128, the bore 126 radially constricts to define an anular, radially inwardly extending, upwardly facing shoulder 130. At its radially inner extent, the shoulder 130 intersects the lower, larger diameter end of a frusto-conical, radially outwardly and upwardly facing surface 132. The radially inner, upper, smaller diameter end of the surface 132 is of approximately the same diameter as the conduit 16 surface 80 and intersects the radially outer extent of an annular, upwardly facing shoulder 134. From the radially inner extent of the shoulder 134, the bore 126 proceeds downwardly generally cylindrically at 136, having a diameter slightly greater than that of the ball member relieved surface 32 then flares frusto-conically at 138 to the lower end 140 of the tubular member 124. It should be observed that the shoulder 134 generally underlies the conduit 16 lower end 76. The exterior 142 of the tubular member 124 is shown being generally cylindrical, having a diameter increase at 144 and upwards coincident with the conduit 16 surface 86 whereby a piston receiving cylinder 146 is defined between the exterior of the conduit 16 and the bore of the tubular member 124, delimited at its upper extent by the under surface 102 of the cylinder head 100 and at its lower extent by the shoulder 130.

A piston 148 is received in the cylinder 146 for vertically sliding movement therein between the lower extreme shown in FIGURE 1 and the upper extreme shown in FIGURE 2. In the embodiment illustrated, the piston 148 is generally exteriorly cylindrical at 150 having an O.D. approximating that of the surface 128. Near the upper and lower extent thereof, the surface 150 is circumferentially grooved to receive O-rings 152 and 154 respectively, which seal with the surface 128. The upper extent of the surface 150 is coincident with the radially outer extent of the annular, upwardly facing, radially directed surface 156 of the piston 148 which extends between the conduit 16 surface 86 and the tubular member surface 128. The tubular piston 148 bore proceeds, from the top, downwardly, first cylindrically at 156 complementarily to the conduit 16 surface 86, then radially outwardly at 158, cylindrically downwardly a short distance at 160, radially outwardly again at 162, then generally cylindrically at 164 to near the lower end of the bore, where it flares frusto-conically to the bore lower end, forming a downwardly facing annular guide surface 166.

The piston surface 156 is circumferentially grooved to receive an O-ring 168 which seals between the piston and the cylinder surface 86. It should be noticed that first fluid passageway means 170 are formed in the conduit 16 and cylinder head 100 communicating at one end 172 with the cylinder 146 just above the surface 84 and at the other end 174 with the exterior of the cylinder head. The end 174 is constructed and arranged, for instance by being provided with threading for securement to a fluid pressure line 175 extending to the drilling platform above the sea surface. It would also be within the purview of the invention to connect the lines 175 and 182 to a sub-sea pressure control manifold on the main blowout preventer stack. In such an arrangement, the apparatus would be inverted with respect to the position shown in FIGURE 1 and no additional hydraulic lines to the surface would be required for the novel joint, the operation being provided through the blowout preventer control system. Examples of suitable blowout preventer arrangements for use in this modification are shown on pages 4019, 4640 and 1247, of the Composite Catalog of Oil Field Equipment and Services, 1966–67 edition.

The tubular fitting 177 received in the passageway 170 sealingly bridges the juncture between the cylinder head 100 and the conduit 16 to prevent any tendency for leakage to occur at this point. Second fluid passageway means 176 are formed in the cylinder head 100 communicating at one end 178 with the cylinder 146 at the cylinder head lower surface 102 and at the other end 180 with the exterior of the cylinder head. The end 180 is constructed and arranged, for instance by being provided with the threading, for securement to a second fluid pressure line 182 extending to the drilling platform at the sea surface. It should be apparent from comparing FIGURES 1 and 2 that pressurized fluid supplied through the line 175 when the piston is in the FIGURE 1 position thereof will move under the piston at 158 and act upwardly on the surfaces 158, 162 causing the piston to rise to the FIGURE 2 position thereof and that pressurized fluid supplied through the line 182 when the piston is in the FIGURE 2 position thereof will move over the piston at 184 and act downwardly on the piston upper surfaces 184, 186 causing the piston to move downwardly to the FIGURE 1 position thereof.

To provide for possible malfunctioning of the fluid pressure system, the piston is shown having at least one manual operator 188 which comprises an upwardly opening threaded socket 190 formed in the surface 186, a rod-like operator 192 secured in the socket at one end and extending vertically through an opening 194 in the cylinder head 100 and terminating in an eye 196. A peripheral groove 198 in the opening 194 receives an O-ring 200 that seals with the exterior of the rod 192 to prevent fluid leakage from the cylinder and incursion of sea water into the cylinder. A collar 202 is shown threadably received on the rod 192 at 204 just below the eye 196 as an integral portion of the eye. It is contemplated that were the piston 148 T-shaped rather than inverted L-shaped as seen in radial section, the collar 202 could act as a stop to limit downward travel of the piston 148, especially if a plurality of angularly spaced manual operators 188 were provided. In use a cable or similar elongated element extends between the eye 196 and the surface, allowing manual movement of the piston 148 at least in the upward direction.

The ball connector 10 further comprises a bearing ring 206, shown being generally annular, having a narrow radial split at 208 so that it is generally classifiable as a C-ring. The ring 206 has a radially directed, downwardly facing lower surface 210 by which it rests on the housing surface 134. At the radially inner extent of the surface 210 generally coincident with the axially upper extent of surface 136, the ring 206 has a generally upwardly constricting, radially inwardly and downwardly facing frusto-conical surface 212 which at its upper extent intersects the lower end of a short cylindrical surface 214. The latter at its upper extent intersects the lesser diameter end of an upwardly and radially inwardly facing, upwardly enlarging, generally spherically curved annular bearing surface 216 that is complementary to the ball member surface 30. The surface 216 extends nearly to the upper end of the ring 206, there being a circumferential chamber or relief at 218 between the surface 216 and ring upper, radially directed end surface 220. The exterior of the ring 206, proceeding downwardly from the radially outer extent of the surface 220, is first downwardly flaring at 222, then cylindrical at 224 throughout most of the height of the ring, then downwardly tapering at 226 to the bottom 210. The free radius of the ring surface 224 is substantially equal to that of the conduit 16 surface 80 so that the ring 206 is neither forcibly constricted nor forcibly expanded when supporting and locking with the ball member as shown in FIGURE 1.

In the preferred embodiment shown, the ring 206 is formed of hard, elastically flexible material such as steel and its flexibility is increased by providing a plurality of angularly spaced axially directed slits 228 which open radially inwardly of the ring and proceed through about 85 percent of the radial thickness of the ring leaving the ring intact at thin outer regions 229.

The structure shown in FIGURE 1 is completed by the provision of an annular ball member seat member 230 having a radially outer, cylindrical surface 232 that is complementary to, and slidable along, the conduit 16 bore surface 74. The surface 232 is provided with two axially spaced circumferential, outwardly opening grooves 234, 236 respectively adjacent its upper and lower extent and which receive O-rings 238, 240 that seal with the surface 74. The seat member 230 has an upwardly facing radially directed, upper surface 242 of slightly less radially inward extent than the conduit 16 stop surface 72 which it faces and is adapted to abut. Proceeding to describe the bore 244 of the seat member from the top, first there is a relieved, generally cylindrical surface 245, which at its lower extent intersects the upper lesser diameter end of a radially inwardly and downwardly facing, downwardly enlarging spherically curved annular surface 246 that is complementary to the ball member surface 28. Coincident with the ball member flat 32, the bore of the seat member 230 is circumferentially relieved at 248 to provide a gap 250 between the seat member and the ball member coincident with the flat 32. The surface 246 is circumferentially grooved at 252 and receives an O-ring 254 for sealing with the ball member surface 28.

It should now be noticed that the seat member 230 is somewhat axially shorter than the axial distance between the conduit 16 surface 72 and the bearing ring 206, surface 220. Coil springs 256 received in and protruding downwardly from the conduit 16 sockets 78 engage the surface 242 and resiliently urge the seat member 230 downwardly. As shown best in FIGURE 2, the bearing ring 206 surface 220 provides a lower stop and support for the seat member 230 when the ball member and housing member are separated.

Looking especially at FIGURE 2, the ball member 14 on the conduit 12 is shown projecting upwardly from the blowout preventer 48 to which it is fixedly secured, the latter being mounted near the sub-sea bottom. The housing 18 on the lower end of the conduit 16, is in turn fixedly secured to the lower end of a riser 58 and lowered down from the sea surface using guide structure, not shown, typified by that shown in FIGURES 11–15 of the commonly assigned copending U.S. patent application of Crain and Pierce, Ser. No. 478,504 filed June 23, 1965. As the housing 18 is lowered near the ball member 14, the guide surfaces 138, 136 and 212 successively aid in aligning the housing with the ball member entering it.

As illustrated in FIGURE 2, the piston 148 is in its upper position during this stage, so the ring 206 is radially unconfined. As the housing is lowered further, the ball surface 28 acting on the ring surface 212 forcibly elastically expands the bearing ring 206 generally radially by widening the gap 208, until it passes over the outside diameter of the ball at 32, whereupon the bearing ring springs in again placing the bearing surface 216 in contact with the lower spherical surface 30 of the ball member. Further axial make-up of the ball member 14 and housing 18 is stopped by the abutment of the surface 242 on the seat member and the surface 72 on the conduit 16, the seat member 230 having been forced upwardly by the ball and compressed the springs 256.

Pressurized fluid such as hydraulic fluid, is then admitted to the cylinder 146 through the line 176, forcing the piston 148 down to the FIGURE 1 position thereof wherein it radially backs-up the bearing ring 206, the latter having its original rest diameter. The connector 10 is now locked against parting because the bearing ring 206 is being radially held in a condition where its inside diameter is smaller than the ball member largest outside diameter. As indicated in FIGURE 1, even in this locked condition, the riser, housing and conduit 16 are free to pivot about 10 degrees in any direction from the longitudinal axis of the conduit 12 and can be rotated at will about that axis.

Fluid pressure within the bore 22, 64 of the conduit string 12, 16 is retained by the seals 238, 254. The floating seat member 230 is retained in sealing contact with the ball member surface 28 by the springs 256 and by the fluid pressure within the conduit bores 22, 64 acting on the effective area in the upper region of the seat member between the seals 238, 254. The seals 154, 96 and 240 protect finished surfaces against the sub-sea environment.

To disconnect the connector 10, fluid pressure is applied to the piston surfaces 158, 162, through the line 175 (the line 182 being bled back to the fluid pressure reservoir back at the drilling platform at the sea surface). This raises the piston 230 out of radially constricting relationship with respect to the bearing ring 206 leaving the latter radially unsupported. An upward pull on the riser 58 causes the ball surface 30 to cam the bearing ring radially outwardly sufficiently to allow the bearing ring to move upwardly past the ball member effecting a separation of the riser from the blowout preventer stack. Once free, the bearing ring 230 springs back to its rest position ready for another make-up.

It should now be apparent that many modifications may be made on the connector 10 without detracting from its utility. For instance the bearing ring 230 could be made of several segmental parts held together by flexible links although this would increase the complexity of that member, which functions well as shown. More than one connector 10 could be included in one string of conduit. When the housing and riser have been withdrawn to the surface a protective cover or cap can be conventionally lowered and placed over the ball member to block its bore and protect its machined surfaces. Clearly, the connector 10 can be employed as a member in a casing string including a casing, a casing hanger, a casing head, the blowout preventer stack 48, the connector 10 and the riser 58 as the casing string is made up and lowered from the drilling platform into the well as a unit, with the casing head being conventionally supported at or near the sub-sea floor.

It should now be apparent that the embodiment described herein efficiently accomplishes each of the objects of the invention set forth at the beginning of this specification and that the description clearly sets forth the principles of the invention.

I claim:

1. An articulated disconnectable connector for interposition in a generally vertical underwater well riser, comprising: a first conduit having a generally ball-shaped member formed exteriorly circumferentially thereon at one end thereof, the bore of the first conduit proceeding through said ball-shaped member; a second conduit having means defining a generally tubular housing thereon constructed and arranged to accept said ball-shaped member in the bore thereof through one end of said bore; means defining a circumferential seat in said bore constructed and arranged to contact said ball-shaped member and limit incursion of said ball-shaped member into said bore; expansible-contractile locking means comprising a generally annular bearing ring of elastic hard metal, received in said bore axially spaced from said seat toward said bore one end and movable between a first position wherein said ball-shaped member is relatively movable axially past said locking means into and out of said bore and a second position wherein said locking means generally annularly engages said ball-shaped member near said first member one end and retains said ball-shaped member in said bore in engagement with said seat; and means restraining said bearing ring in said first and second positions against axial movement relative to said housing movable means received in said housing for selectively locking said bearing ring against forcible expansion from said second position to said first position thereof, said movable means comprising: a generally tubular piston received in said housing bore and being axially movable between a first position wherein said tubular piston circumferentially surrounds and radially restricts expansion of said bearing ring and second position wherein said tubular piston is disengaged from said bearing ring and said bearing ring is radially unconstrained by the tubular piston sufficiently to permit forcible expansion of said bearing ring from said second position to said first position.

2. The connector of claim 1 wherein the bearing ring comprises a one piece annulus of steel having a radial split defining at most a narrow gap therethrough when the bearing ring is in said second position.

3. The connector of claim 1 wherein said circumferential seat comprises an annular seat ring received in means defining a circumferential groove in said housing bore; said ball-shaped member exterior having means defining an annular, generally spherically curved, upwardly and outwardly facing, downwardly enlarging band thereon in the upper region thereof; said ball-shaped member exterior having means defining an annular, generally spherically curved, downwardly and outwardly facing, upwardly enlarging band thereon in the lower region thereof, said annular seat ring having means defining a generally spherically curved annular seating surface thereon generally facing said housing bore one end and arranged to generally coextensively, generally complementarily engage said upper region band on said ball-shaped member; said annular bearing ring having means defining a generally spherically curved annular bearing surface thereon generally facing away from said housing bore one end and arranged to coextensively, generally complementarily engage said lower region band on said ball-shaped member when said ball-shaped member is received in said bore and said bearing ring is in said second position; said lower region band projecting further toward said bore one end than said bearing ring bearing surface and said bearing ring in said second position having a minimum inner diameter that is intermediate the maximum and minimum diameters of said lower region band whereby said second conduit is pivotable with respect to said first conduit about said ball-shaped member.

4. The connector of claim 3 further including resilient means received between said second member and said annular seat ring and constructed and arranged to resiliently urge said annular seat ring toward said bore one end.

5. The connector of claim 3 further comprising means defining a circumferential groove in said seating surface and an annulus of resilient sealing material received in said groove for sealing with said upper region band; and circumferential sealing means received between said annular seat ring and said housing bore.

6. The connector of claim 1 wherein said bearing ring further comprises a downwardly facing, downwardly enlarging annular guide surface in partly constricted relationship with said bore when said bearing ring is in the second position thereof, said guide surface being constructed and arranged for contacting the ball-shaped member as the latter enters said bore whereby said ball-shaped member in contact with said guide surface cams said bearing ring from said second position to said first position.

7. The connector of claim 1 further comprising means defining a cylinder in said second conduit and tubular housing, said tubular piston being received in said cylinder; and means for communicating fluid under pressure to said cylinder for driving said piston between the first and second positions thereof.

8. A tubular connectable-disconnectable ball joint connector for interposition in an underwater well riser, comprising: a first tubular member having annular ball surface means formed exteriorly thereon adjacent one end thereof, the ball surface means including a first and a second generally spherically curved annular band adjacent opposite extents of the ball surface means, axially of the first tubular member; a second tubular member having means defining a tubular housing mounted coaxially thereon at one end thereof; means defining an annular seat within said housing, coaxially therewith and having first annular surface means thereon curved complementarily to said first ball surface means annular band; a split annular bearing ring mounted in said housing coaxially therewith and having second annular surface means thereon curved complementarily to said second ball surface means annular band, said first and second annular surface means being axially spaced and facing one another, said second annular surface means having a greater internal diameter than the external diameter of said first conduit member adjacent said second generally spherically curved annular surface; a tubular piston coaxially received in said housing and being axially slidable therein between a first position wherein said piston circumferentially surrounds and engages said bearing ring to lock said first tubular member ball surface means within said housing for pivoting relative thereto with said first annular band bearing upon said first annular surface means and said second annular band bearing upon said second annular surface means, and a second position wherein said ring is free to expand sufficiently to permit insertion and withdrawal of said first tubular member ball surface means into and from said housing and means restraining said bearing ring in said first and second positions against axial movement relative to said housing.

9. The connector of claim 8 wherein said expansible-contractile locking means comprises a generally annular bearing ring of elastic hard metal.

References Cited

UNITED STATES PATENTS

| | | | |
|---|---|---|---|
| 733,065 | 7/1903 | Martin | 285—267 |
| 1,995,109 | 3/1935 | Smittle | 285—266 |
| 2,199,588 | 4/1940 | Cobham et al. | 244—135 |
| 2,226,826 | 12/1940 | Miller | 285—321 X |
| 2,329,369 | 9/1943 | Haver | 285—166 X |
| 2,848,255 | 8/1958 | Klein et al. | 285—321 X |
| 3,147,992 | 9/1964 | Haeber et al. | 285—18 |
| 3,222,089 | 12/1965 | Otteman | 285—18 |
| 3,241,864 | 3/1966 | Shaffer | 285—317 X |
| 3,325,190 | 6/1967 | Eckert et al. | 285—18 |
| 3,378,281 | 4/1968 | Smith. | |

FOREIGN PATENTS

| | | |
|---|---|---|
| 430,215 | 6/1935 | Great Britain. |
| 714,600 | 9/1954 | Great Britain. |

CARL W. TOMLIN, *Primary Examiner.*

DAVE W. AROLA, *Assistant Examiner.*

U.S. Cl. X.R.

166—0.6; 285—84, 267, 315, 321